US012179938B2

(12) United States Patent
Nagananda Tejasvi et al.

(10) Patent No.: US 12,179,938 B2
(45) Date of Patent: Dec. 31, 2024

(54) ACTIVE LANDING MARKER

(71) Applicant: Honeywell International Inc., Charlotte, NC (US)

(72) Inventors: P R Nagananda Tejasvi, Bangalore (IN); Irayya Hiremath, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 60 days.

(21) Appl. No.: 17/877,248

(22) Filed: Jul. 29, 2022

(65) Prior Publication Data
US 2023/0399127 A1 Dec. 14, 2023

(30) Foreign Application Priority Data

Jun. 9, 2022 (IN) .............................. 202211033013

(51) Int. Cl.
*B64F 1/20* (2006.01)
*B64F 1/18* (2006.01)
*B44C 1/00* (2006.01)

(52) U.S. Cl.
CPC .................. *B64F 1/20* (2013.01); *B64F 1/18* (2013.01); *B64F 1/205* (2013.01); *B44C 1/00* (2013.01)

(58) Field of Classification Search
CPC .... B44C 1/00; B44C 1/26; B44C 1/28; B44C 3/00; B44C 3/046; B44C 3/048; G01D 5/20; G06T 7/70; H04N 5/33; B60C 11/24; B60C 11/243; B60C 11/246; B60Q 1/00; B60Q 1/326; G06K 19/06; G06K 19/077; G06K 17/10; B64F 1/18; B64F 1/20; B64F 1/205
See application file for complete search history.

(56) References Cited

U.S. PATENT DOCUMENTS

| 3,813,064 | A | 5/1974 | Heyworth |
| 7,786,898 | B2 * | 8/2010 | Stein .................... G06V 20/584 |
| | | | 340/436 |

(Continued)

FOREIGN PATENT DOCUMENTS

| WO | 2016196093 A1 | 12/2016 |
| WO | 2020178946 A1 | 9/2020 |

OTHER PUBLICATIONS

NPL Search (Nov. 22, 2023).*

(Continued)

*Primary Examiner* — Van T Trieu
(74) *Attorney, Agent, or Firm* — Fogg & Powers LLC

(57) ABSTRACT

An active landing marker including a housing, a cover panel, a marker panel and an energy source is provided. The cover panel is coupled to the housing, the cover panel made of polarized translucent material. The marker panel is positioned within the housing. The marker panel includes a plurality of selectively positioned energy absorbing sections and a plurality of energy transmission sections. The energy source is contained within the housing. The marker panel being positioned between the energy source and the cover panel. Energy radiated from the energy source passing through the energy transmission sections of the marker panel and through the cover panel generating an active signal marker having a unique marker pattern. The active signal marker aiding in the landing of vehicles during varying environmental conditions.

20 Claims, 6 Drawing Sheets

(56) References Cited

U.S. PATENT DOCUMENTS

| | | |
|---|---|---|
| 10,395,544 B1 | 8/2019 | Harris et al. |
| 11,231,706 B1 | 1/2022 | Curlander et al. |
| 2009/0058681 A1* | 3/2009 | Johnston .................. B64F 1/20 340/947 |
| 2010/0023189 A1 | 1/2010 | Suddreth et al. |
| 2013/0021172 A1 | 1/2013 | Boedeker |
| 2013/0035917 A1* | 2/2013 | Chentanez ............. G06T 17/20 703/9 |
| 2013/0094088 A1* | 4/2013 | Merrill ................. G02B 5/0242 264/2.6 |
| 2013/0141255 A1 | 6/2013 | McDermott |
| 2014/0070052 A1 | 3/2014 | Kang |
| 2016/0122038 A1 | 5/2016 | Fleischman et al. |
| 2019/0197908 A1 | 6/2019 | Mozer et al. |
| 2020/0301445 A1 | 9/2020 | Jourdan et al. |
| 2020/0332983 A1* | 10/2020 | Carome .................. F21V 7/06 |
| 2021/0096001 A1* | 4/2021 | Schneider ............ G01D 5/2073 |
| 2021/0356572 A1 | 11/2021 | Kadambi et al. |
| 2021/0394929 A1 | 12/2021 | Mizobe |

OTHER PUBLICATIONS

European Patent Office, "Extended European Search Report", from U.S. Appl. No. 17/877,248, filed Oct. 10, 2023, from Foreign Counterpart to U.S. Appl. No. 17/877,248, filed Oct. 10, 2023, pp. 1 through 12, Published: EP.

Wikipedia, "Liquid-crystal display", as downloaded Sep. 28, 2023 from https://Bn.wikipedia.org/w/index.php?title=Liquid-crystal display &oldid=1090856663, pp. 1 through 16.

Marut et al., "ArUco markers pose estimation in UAV landing aid system", Downloaded on Feb. 15, 22 at from IEEE Xplore, pp. 261 through 266, © 2019 IEEE.

* cited by examiner

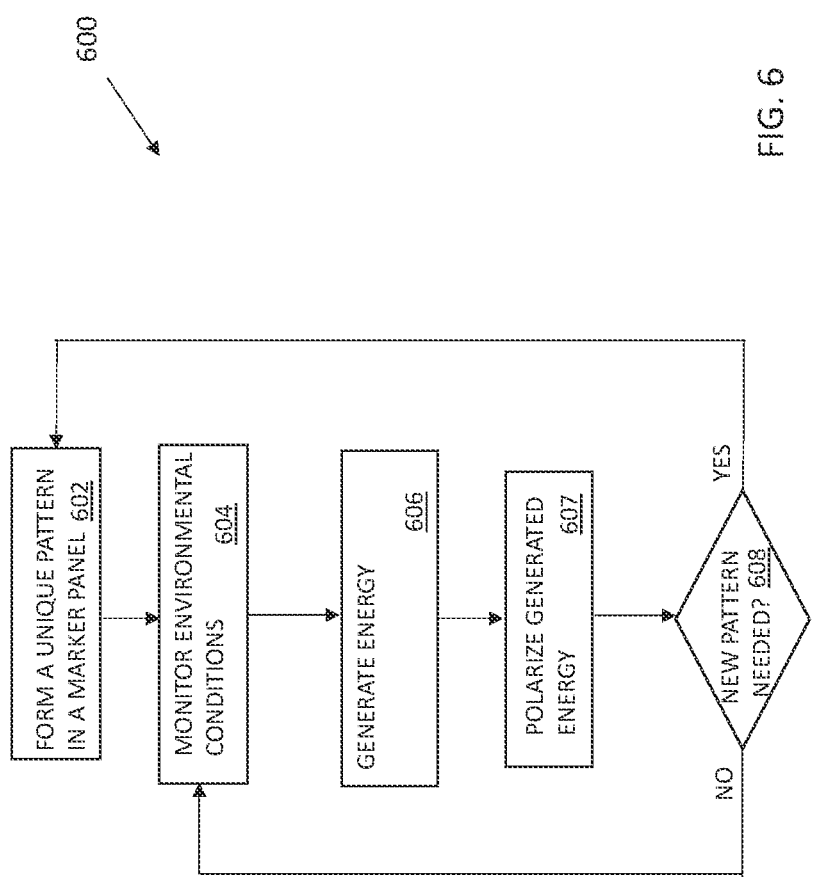

ACTIVE LANDING MARKER

CROSS-REFERENCE TO RELATED APPLICATIONS

This application claims priority to Indian Provisional Application No. 202211033013 filed on Jun. 9, 2022 and titled "ACTIVE LANDING MARKER," the contents of which is incorporated herein in its entirety.

BACKGROUND

The Federal Aviation Administration (FAA) has approved Visual Flight Rules (VFR) for Urban Air Mobility (UAM) Operations. Precision landings are fundamental to all aircrafts including UAM/Drones/electric vertical take-off and landing (eVTOL) vehicles. Autonomous precision landings guided by marker-based landings (MBLs) for UAM/drones/eVTOL vehicles under VFR require clear day light conditions. With MBLs, markers with unique patterns are used to identify a landing site and provide guidance references for the vehicle to land. An example of a unique pattern is an Augmented Reality University of Cordoba (ArUco) pattern.

Typically, printed landing markers of different dimensions and patterns are positioned in relation to each other at a landing site. Once a camera of a vehicle, capturing images in real time, captures an image of landing markers, and the identity is verified, a MBL algorithm is used by the vehicle to start and control decent to the landing site or landing pad. The MBL algorithm provides real-time position estimates used by the vehicle to control the decent. For example, based on images of the landing markers, the MBL algorithm may use Euler angles in a north-east-down (NED) coordinate system and a global positioning attitude heading reference system (GPAHRS) sensor fusion system to enable vertical and horizontal correction of the vehicle in achieving a precision landing of the vehicle.

Precision landings are fundamental to all aircrafts including UAM/Drones/eVTOL vehicles. With these types of unmanned vehicles, not having the ability to clearly detect the landing markers hinders the ability to perform precise landings at a designated landing site. Not being able to clearly detect the landing markers may be due to environmental conditions such as dusk, dawn, night, smog, fog, snow, rain, etc.

Further, it is anticipated that UAM Operations will be required to also be operated with digital flight rules (DFR) which include the VFR and instrument flight rules (IFR). The objective of DFR is to provide safe and unfettered access to the airspace to all participating vehicle operators under all visibility, all-weather conditions without incurring the limitations in operational flexibility inherent to IFR and even VFR.

For the reasons stated above and for other reasons stated below which will become apparent to those skilled in the art upon reading and understanding the present specification, there is a need for a landing marker that can be used during varying environmental conditions.

SUMMARY OF INVENTION

The following summary is made by way of example and not by way of limitation. It is merely provided to aid the reader in understanding some of the aspects of the subject matter described. Embodiments provides an active landing marker that generates a unique pattern that can be clearly identified during different environmental conditions.

In one embodiment, an active landing marker including a housing, a cover panel, a marker panel and an energy source is provided. The cover panel is coupled to the housing, the cover panel made of polarized translucent material. The marker panel is positioned within the housing. The marker panel includes a plurality of selectively positioned energy absorbing sections and a plurality of energy transmission sections. The energy source is contained within the housing. The marker panel being positioned between the energy source and the cover panel. Energy radiated from the energy source passing through the plurality of energy transmission sections of the marker panel and through the cover panel generating an active signal marker having a unique marker pattern. The active signal marker aiding in the landing of vehicles during varying environmental conditions.

In another embodiment, an active landing marker including a housing, a cover panel, a marker panel, and at least one energy source. The cover panel is coupled to the housing. The cover panel is made of polarized translucent material. The marker panel is positioned between the cover panel and housing. The marker panel includes a plurality of selectively positioned energy absorbing sections and a plurality of energy transmission sections. The at least one energy source is positioned to direct energy to the marker panel. Energy radiated from the energy source is absorbed by the energy absorbing sections of the marker panel and directed out of the cover panel by the energy transmission sections to generate an active signal marker having a unique marker pattern. The active signal marker aiding in the landing of vehicles.

In still another embodiment, a method of generating an active landing marker is provided. The method including forming a unique pattern in a marker panel with a plurality of energy absorbing sections and a plurality of energy transmission sections; generating energy that is absorbed by the energy absorbing sections and transmitted from the energy transmission sections; and polarizing the transmitted energy to define the unique pattern with the transmitted energy that aids in the landing of vehicles during varying environmental conditions.

BRIEF DESCRIPTION OF THE DRAWINGS

The present invention can be more easily understood and further advantages and uses thereof will be more readily apparent, when considered in view of the detailed description and the following figures in which:

FIG. 6 illustrates a flow diagram of a process for generating an active landing marker according to an example aspect of the present invention.

In accordance with common practice, the various described features are not drawn to scale but are drawn to

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

As discussed above, current landing markers use printed markers. Printed landing markers are passive markers because they rely on ambient light that is reflected off of the markers to provide the identification of a unique identifier of the landing marker. Hence, passive landing markers typically can only be used during daylight landing operations when sufficient ambient light is present.

Embodiments provide self-contained active landing markers. The active landing markers enable use of a vehicle's MBL system in all visibility conditions without incurring the limitations in operational flexibility inherent to IFR and even VFR. In embodiments, radiated energy from an energy source is used to form a unique marker pattern that is used by a vehicle to identify and perform a precision landing of the vehicle in varying environmental conditions.

In one example, the unique marking pattern is made with a marker panel that includes absorbing sections that absorb the energy from the energy source and energy transmission sections that radiate the energy from the active landing marker. The radiated energy is detected by the systems on the vehicle. The pattern made by the energy identifies an associated landing site and provides a reference for a vehicle's MBL system to aid in accomplishing a precision landing at the landing site.

Figure 1:
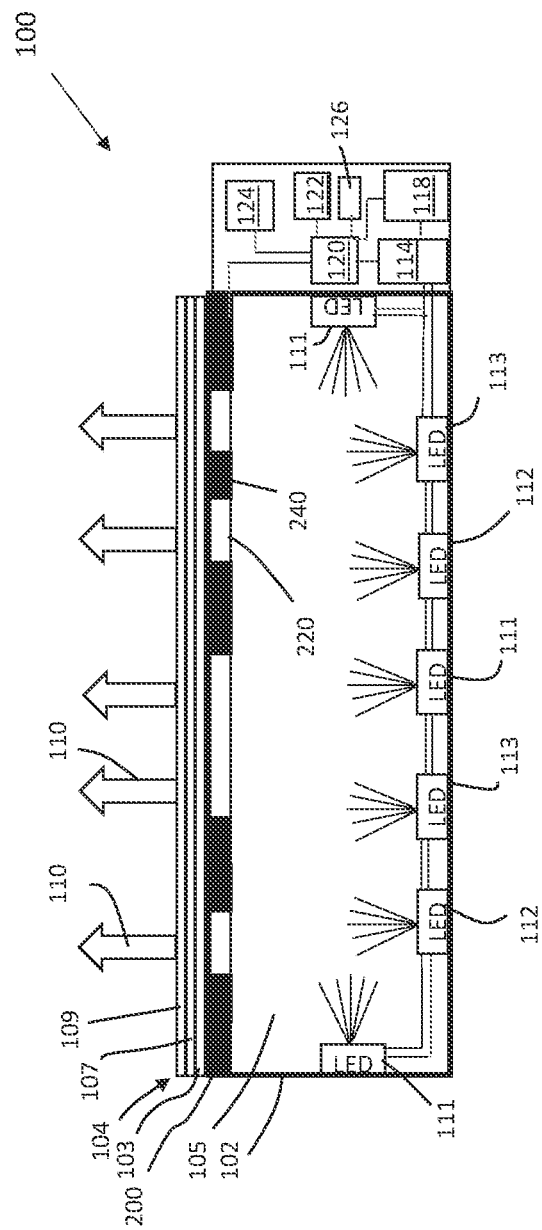
FIG. 1 is a block diagram of an active landing marker according to an example aspect of the present invention.

FIG. 1 illustrates a block diagram of an active landing marker 100 of an example embodiment. The active landing marker 100 includes a housing 102. A cover panel 104 is used to form an enclosed cavity 105 with the housing 102. In one example, the cover panel 104 is made of a translucent material that radiates energy 110 from an energy source that is located within the cavity 105 of an active landing marker 100. In one example, the cover panel 104 is made of a polarizing material to radiate energy in only one select direction to help define and identify the unique pattern generated by the active landing marker 100. Further in an example, the cover panel 104 is made from a translucent white polarized material. In yet another example, the cover panel 104 is made from a translucent amber polarized material. In still another embodiment, the cover panel 104 is made from a translucent polarized material with near infrared (NIR) properties that emits NIR light in response to the NIR radiated energy from the energy source.

As discussed above, the cover panel may include polarizing material. Undesired reflections captured in a field of view of an image sensor (camera) on vehicles can cause issues when trying to identify a landing marker and implement a MBL system. This may occur, for example, as a result of bright sunlight reflecting off of bright regions or light sections of the active landing marker 100. The polarized material in the cover panel addresses this issue. In one example, the polarized material includes a liner polarizing film 103 such as, but not limited to, a Dichroic thin film. In another example wire-grid polarizers may be used. The polarizing material absorb incident light oscillating in all but one plane, its polarizing axis, yielding linear polarization. Liner polarization of a randomly polarized light source further may reduce the intensity of the source by fifty to sixty five percent. This makes the polarization material effective in evening out illumination levels within the filed of illumination region of the active landing marker 100. The cover panel 104 may further include one of an anti-glare coating 107 and a scratch-resistant covering 109.

The energy source in the example illustrated in FIG. 1 are energy producing elements such as, but not limited to, a plurality of light emitting diodes (LEDs) 111, 112 and 113. The LEDS 111, 112 and 113, in this example, are positioned within the cavity 105 of the housing 102. In the LED example, the LEDS 111, 112 and 113 are coupled to an LED driver 114 to regulate power to one or more strings of LEDs 111, 112 and 113 from a power source 118.

In one example, different LEDS 111, 112 and 113 transmit different color light. For example, LEDS 111 may be configured to transmit white light, LEDS 112 may be configured to transmit amber light and LEDS 113 may be configured to transmit RED light or GREEN light or BLUE light or may be a combination of the RGB light. Further in an example, the cover panel 104 may be made of a translucent white or amber polycarbonate, or other material like hardened glass.

Figure 2:
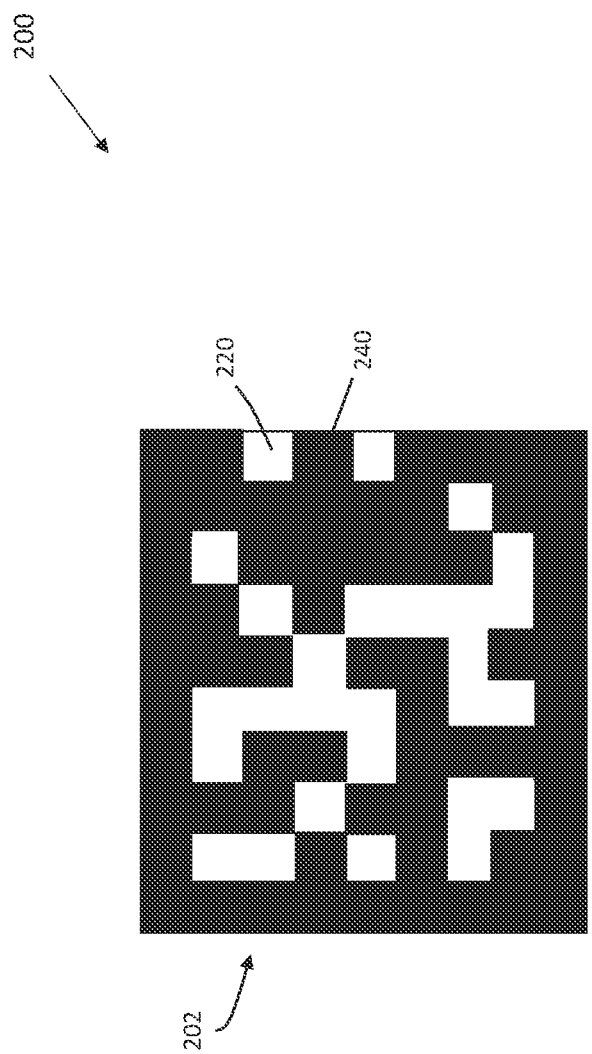
FIG. 2 illustrates an example of a marker panel according to an example aspect of the present invention.

Also illustrated in FIG. 1 is a marker panel 200 that is received within the cavity 105 of the housing 102 adjacent the cover panel 104 in this example. The marker panel 200, as best illustrated in FIG. 2, defines the unique pattern 202 of the active landing marker 100 that is used by the vehicle to identify a location, such as a landing site, and provide a reference for precision landings. The unique pattern 202 is made from a plurality of energy transmission sections 220 and a plurality of energy absorbing sections 240. In the Example of FIG. 1, the energy transmission sections 220 are translucent sections that allow energy generated from the LEDS 113, 112 and 111 to pass through and the energy absorbing sections 240 are made from a plurality of opaque sections that blocks light from the LEDS 113, 112 and 111 from passing through. The energy transmitted through the energy transmission sections 220 passes through the cover panel 104 that includes polarized material.

In one example, the unique pattern 202 is an ArUco pattern. The energy absorbing sections 240 of the marker panel 200 provide a binary zero of the ArUco pattern while the energy transmission sections 220 provide a binary one of the ArUco pattern. In an example, a landing identification site system in a vehicle, identifies a desired landing sited based on a detected ArUco pattern and a MBL system of a vehicle uses the unique ArUco pattern of one or more active landing markers 100 to accomplish a precision landing of the vehicle.

In an example, the unique pattern 202 of the marker panel 200 of the active landing marker 100 is designed to be changed. In one example, a different marker panel 200 with a different unique pattern 202 is used to just replace a current marker panel 200. In another example, the marker panel 200 may be designed to selectively reconfigure its unique pattern. For example, the marker panel may be made from a plurality of dimmable glass sections or liquid crystal plates that selectively block or allow the transmission of light. In a dimmable glass section example, suspended particle devices (SPDs) that include rod like nano-scale particles are suspended in a liquid between pieces of glass or plastic. The suspended particles are randomly organized in the absence of a voltage. The randomly organized particles block and absorb energy making the section opaque. When a voltage is applied, the suspended particles align letting the energy to pass through. In another example a mechanical energy absorbing shutter system may be used to modify select sections of the marker panel to achieve a desired unique pattern 202.

In examples that include changeable sections in a marker panel, a controller 120 may be used to selectively apply voltage from the power source 118 to select sections to create a desired unique pattern in the marker panel 200. The controller 120 may be in communication with a memory 122 that stores operating instructions implemented by the controller 120. Further, the controller 120 may be in communication with a wireless communication unit 124. The wireless communication unit 124 may be used to receive remote operating signals relating to a desired unique pattern in the marker panel 200 or broadcast a current unique pattern to a remote location such as a vehicle seeking the landing site or a ground station.

In general, the controller 120 may include any one or more of a processor, microprocessor, a digital signal processor (DSP), an application specific integrated circuit (ASIC), a field program gate array (FPGA), or equivalent discrete or integrated logic circuitry. In some example embodiments, controller 120 may include multiple components, such as any combination of one or more microprocessors, one or more controllers, one or more DSPs, one or more ASICs, one or more FPGAs, as well as other discrete or integrated logic circuitry. The functions attributed to the controller 120 herein may be embodied as software, firmware, hardware or any combination thereof. The controller 120 may be part of a system controller or a component controller. The memory 122 may include computer-readable operating instructions that, when executed by the controller 120 provides functions of creating desired unique patterns in the marker panel 200. The computer readable instructions may be encoded within the memory 122. Memory 122 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

It may further be desired to change the wavelength of the energy transmitted from the active landing marker. This may be due to the changing of environmental conditions. In one example, the controller 120 may further act as a switch, switching between LEDs 112 or LEDS 111 or LEDs 113 to achieve a desired radiated energy of a select wavelength. Other systems to change the wavelength of the radiated energy may be used including but not limited to, filtering through a shutter system. The radiated energy 110 from the active landing marker 100 may be set at a select wavelength for a given environmental condition. The given environmental condition may be determined by one or more sensors 126 or through a remote communication signal received through the wireless communication unit 124. An example of types of sensors 126 that may be used includes, but is not limited to, light sensors, temperature sensor, moisture sensors, and smoke sensors etc.

Further, the luminosity of the radiated energy from the active landing marker 100 may be electronically controlled in an example taking into consideration the current ambient light available and glare. This may be accomplished by the controller 120 with luminous flux sensor signals from the at least one sensor 126.

In an example, an active landing marker 100 may be configured to radiate white light based on a luminous flux sensor input from the at least one sensor 126. Each energy transmission section 220 of the unique pattern 202 in this example is optically illuminated with white light. The energy absorbing sections 240 may include non-reflective black sections. The luminosity of the light may be electronically controlled with respect to the ambient light and glare with the luminous flux sensors input. White light may be used for day and night landings during clear visibility environmental conditions or clear visual meteorological conditions (VMC). The vehicle may use a low light electro-optical camera for the MBL system.

In another example, yellow light may be used with active landing marker 100. In one example, filtering techniques may be used on generated white and amber light to radiate yellow light of 580 nm wavelength. Yellow light may be used during day and night landings in low visibility landing conditions under instrument meteorological conditions (IMC).

In another example, more than one color of light maybe used in generating the unique pattern. In one example, RED color LEDS, BLUE color LEDS, GREEN color LEDS or a combination of the RGB color LEDS are used. For example, the marker panel 200 may form a chroma-tag code with the sections of the marker panel 200 optically illuminated with specific color light sources which may be accomplished with filtering and/or polarization techniques or different LEDS 111, 112 and 113. This configuration may be used for both day and night landings in clear and low visibility landing conditions under VMC. A color code of the active landing marker or a group of active landing markers also provides more options for encoded data which provides an enhanced security element.

In still another example, the active landing marker 100 is designed to radiate energy in the NIR spectrum. In one example, energy transmission sections 220, of the unique pattern, are optically illuminated with NIR light greater than 850 nm wavelength using filters and/or coatings and polarization techniques. This configuration works well for night landings in very low visibility landing conditions under instrument meteorological conditions (IMC). The vehicle would use a near infrared camera in capturing the unique pattern from the active landing marker.

Other types of energy sources beside LEDs may be used to create a desired unique pattern with the marker panel 200. For example, heating sources may be used to generate far infrared energy, such as hot surface far infrared (FIR) energy, that are used in generating the desired unique pattern. This type of active marker-based landing system may be useful when used in inclement weather conditions where visible light is hard to detect.

Figure 3:
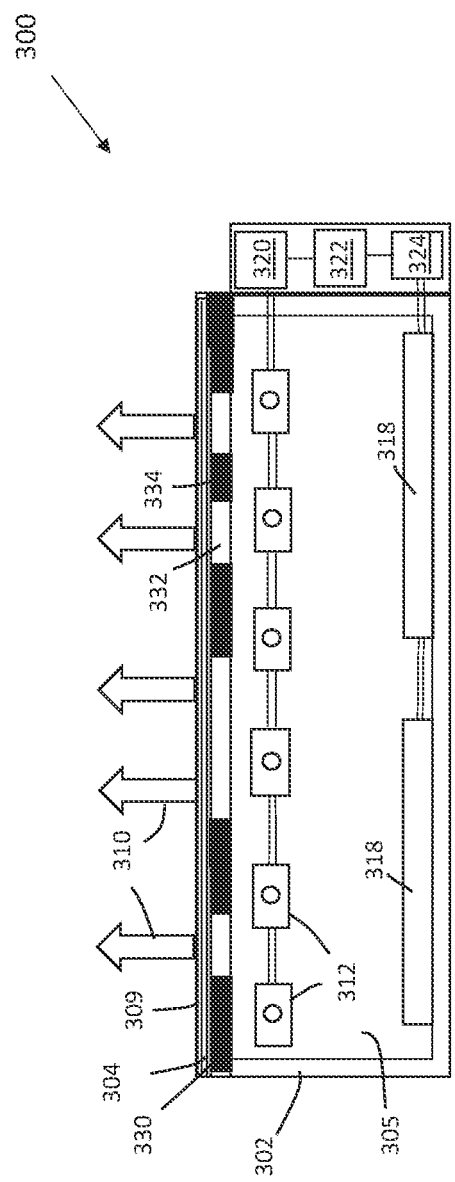
FIG. 3 illustrates another block diagram of an active landing marker according to an example aspect of the present invention.

An example of an active landing marker 300 that include heat sources 312 to generate FIR energy is illustrated in FIG. 3. The active landing marker 300 includes a housing 302. A cover panel 304 is used to form an enclosed cavity 305 with the housing 302. In one example, the cover panel 304 is made of thermal conducting material that radiates thermal energy 310 from the heat sources 312 that is located within the cavity 305 of active landing marker 300. The cover panel 304 may further include a scratch-resistant covering 309.

In one example, the heat sources 312 are ceramic cartridge heaters. A controller 320, such as a thermal controller, may control energy from an energy source 322 to regulate the generated FIR energy from the heat sources 312. This example further includes thermoelectric cooling pads 318 that are spaced a distance from the heat sources 312. The thermoelectric cooling pads 318 transfers heat out of the cavity 305 to a frame of the housing 302 to regulate the temperature within the cavity 305 therein preventing the overheating of components and a consistent unique pattern. A controller 324, such as a thermal controller 324 may control energy from an energy source 322 to regulate the heat transfer provided by the thermal controller 324.

In one example, a marker panel 330 is used that includes energy transmission sections 332 of thermally conductive material and energy absorbing sections 334 of thermal absorbing materials to generate the unique pattern provided by the active landing marker 300. In another example, the heat sources 312 themselves are arranged in a desired unique pattern and are positioned adjacent the cover panel 304 to generate the unique pattern through the cover panel 304.

Figure 4:
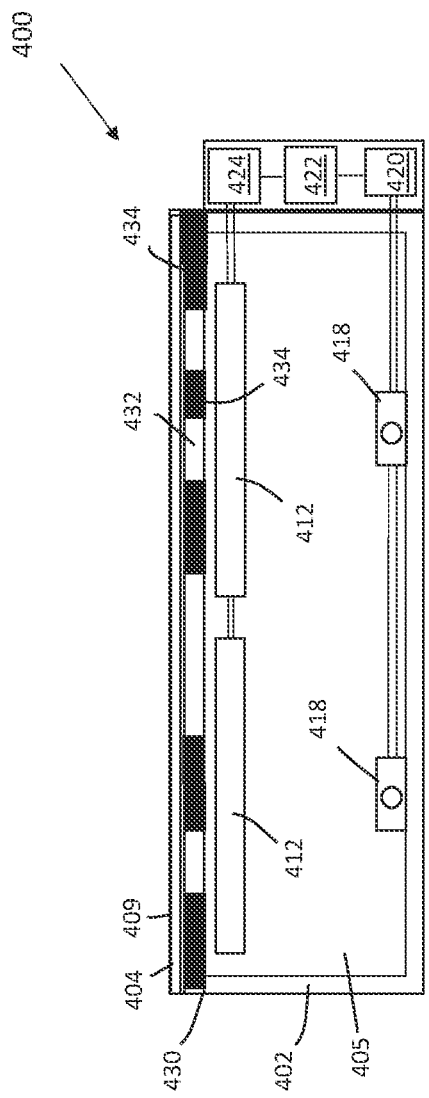
FIG. 4 illustrates still another block diagram of an active landing marker according to an example aspect of the present invention.

Another example of an active landing marker 400 is illustrated in FIG. 4. In this example, the unique pattern is made in the marker panel 430 with cold sections. The unique pattern can be read with thermal image capturing device in a vehicle. Active landing marker 400 includes thermoelectric cooling pads 412 used to cool material in select energy transmission sections 432 of the marker panel 430. The active landing marker 400 includes a housing 402. A cover panel 404 is used to form an enclosed cavity 405 with the housing 402. In one example, the cover panel 404 is made of thermal conducting material. The thermoelectric cooling pads 412 are located within the cavity 405 of the active landing marker 400. The cover panel 404 may further include a scratch-resistant covering 409.

The marker panel 430 includes the energy transmission sections 432 of thermally conductive material that are cooled by the thermoelectric cooling pads 412 and energy absorbing sections 434 of thermal absorbing materials that thermally insolates the thermoelectric cooling pads to generate the unique pattern provided by the active landing marker 400.

In one example, heat sources 418 are included in the cavity 405 of active landing marker 400 to regulate the temperature within the cavity 405 when needed. A controller 420, such as a thermal controller, may control energy from an energy source 422 to regulate the heat generated by the heat sources 418. Further controller 424, such as a thermal controller may control energy from the energy source 422 to regulate the cooling of the thermoelectric cooling pads 412. In another example, a single controller may be used to control both the thermoelectric cooling pads 412 and the heat sources 418.

Examples of FIGS. 3 and 4 discussed above, provide active landing markers 300 and 400 that provide far infrared/thermal radiated energy signals. Each section 332, 334, 432, and 434 of respective marker panels 330 and 430 of the active landing markers 300 and 400 are thermally controlled. The thermal absorbing materials in the energy absorbing sections 334 and 434 are highly efficient thermal barriers designated considering the environmental temperature and other variations. The active landing markers 300 and 400 may be used in very low visibility conditions in either day or night. The vehicle would include thermal camera for the MBL.

Figure 5:
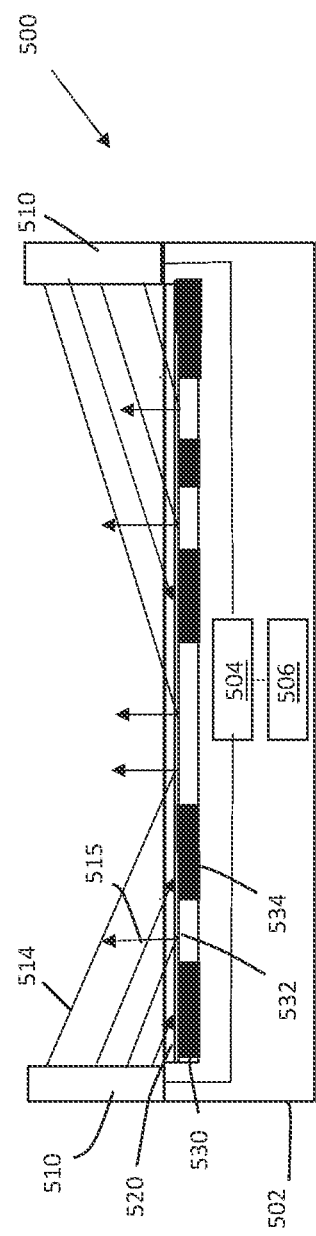
FIG. 5 illustrates yet another block diagram of active landing marker according to an example aspect of the present invention.

Another example the active landing marker 500 is shown in FIG. 5. In this example, within a housing 502 is a power source 506 and a controller 504. The controller 504 in an example, is a simple switch that selectively provides power to energy generating sources 510. The radiated energy from the energy generating sources 510 is projected or directed to a marker panel 530 with a unique pattern is configured of energy absorbing sections 534 and energy reflection sections 532. The energy absorbing sections 534 absorb the radiated energy 514 and while the energy reflection sections 532 reflect the radiated energy 514. The cover 520, made from a polarizing material, directs the reflected radiated energy 515 from the energy reflection section 532 to define the unique pattern to be detected by a camera imaging system in a vehicle. In one example, the external energy generating sources 510 are positioned at corners of the active landing marker 500. This type of active landing marker 500 provides good visibility of the unique pattern at night and during low visibility conditions.

Referring to FIG. 6, an active landing marker flow diagram 600 is illustrated. The flow diagram 600 is provided as a series of sequential blocks. The sequence may occur in a different order or even in parallel in other embodiments. Hence, embodiments are not limited to the sequential order of the blocks as set out in FIG. 6.

Flow diagram 600 starts at block 602 where a unique pattern is formed in a marker panel. As discussed above, the unique pattern is made of with a plurality of energy absorbing sections and a plurality of energy transmission sections. The material that the sections are made is dependent on the type of energy signal used to generate the active unique pattern. The unique pattern is a pattern recognized by a landing identification system of a vehicle and a MBL system of the vehicle uses one or more of the unique patterns as references to accomplish a precision landing of the vehicle.

The active landing marker may include a function that changes the energy signals generated based on current environmental conditions. In this example, the environmental conditions are monitored at block 604. This may be done with the use of one or more sensors and a controller that selects the energy signals based on signals from the one or more sensors. In another embodiment, the current environmental conditions are provided from a remote source through a wireless communication unit.

Energy is generated at block 606. The type of energy depends on the environmental conditions in an example. The type of energy may be selected based on wavelength best suited to convey the unique pattern for the current environmental conditions. This may be done, for example, by switching between energy sources or switching between different LEDs or by filtering techniques as discussed above. As also discussed above the energy is either passed through or reflected off of the energy transmission sections and through a cover of polarizing material at block (607) to radiate the energy in the unique pattern.

At block 608 it is determined if a new unique pattern is needed. This may come based on remote instructions received at the controller via the wireless communication unit. If a new pattern is not needed, the process continues at block 604 monitoring for environmental conditions. If new pattern is needed, a new unique pattern is formed in the marker panel at block 602.

EXAMPLE EMBODIMENTS

Example 1 is an active landing marker including a housing, a cover panel, a marker panel and an energy source. The cover panel is coupled to the housing, the cover panel made of polarized translucent material. The marker panel is positioned within the housing. The marker panel includes a plurality of selectively positioned energy absorbing sections and a plurality of energy transmission sections. The energy source is contained within the housing. The marker panel being positioned between the energy source and the cover panel. Energy radiated from the energy source passing through the plurality of energy transmission sections of the marker panel and through the cover panel generating an active signal marker having a unique marker pattern. The active signal marker aiding in the marker-based landing of vehicles during varying environmental conditions.

Example 2 includes the active landing marker of Example 1, wherein the active signal marker is an ArUco marker, the plurality of energy absorbing sections of the marker panel providing a binary zero of the ArUco marker and the plurality of energy transmission sections providing a binary one of the ArUco marker.

Example 3 includes the active landing marker of Example 2, wherein the plurality of energy absorbing sections and the plurality of energy transmission sections of the marker panel form the ArUco marker pattern.

Example 4 includes the active landing marker of any of the Examples 1-3, wherein the plurality of energy absorbing sections of the marker panel are non-reflective black sections.

Example 5 includes the active landing marker of any of the Examples 1-3, wherein the polarized translucent material of the cover panel is a translucent white polarized material that is configured to emit white light in response to the radiated energy of the energy source.

Example 6 includes the active landing marker of any of the Examples 1-3, wherein the polarized translucent material of the cover panel is a translucent amber polarized material that is configured to emit amber light in response to the radiated energy from the energy source.

Example 7 includes the active landing marker of any of the Examples 1-3, wherein the polarized translucent material of the cover panel is a translucent NIR polarized material that is configured to emit NIR light in response to the radiated energy from the energy source.

Example 8 includes the active landing marker of any of the Examples 1-7, wherein the energy source includes a light source from one of a NIR light source and a LED light source.

Example 9 includes the active landing marker of any of the Examples 1-8, wherein the cover panel further includes at least one of an anti-glare coating and a scratch-resistant coating.

Example 10 includes the active landing marker of any of the Examples 1-4, wherein the cover panel includes thermal conducting and insulating material and wherein the energy source includes a thermal source from one of a heating source and a cooling source.

Example 11 includes the active landing marker of any of Examples 10, wherein the energy source includes at least one of a thermal energy source generating far infrared (FIR) energy signals through the cover panel and a thermoelectric cooling pad.

Example 12 includes the active landing marker of any of the Examples 1-11, wherein the marker panel is reconfigurable to change the unique pattern of the active signal marker.

Example 13 includes an active landing marker including a housing, a cover panel, a marker panel, and at least one energy source. The cover panel is coupled to the housing. The cover panel is made of polarized translucent material. The marker panel is positioned between the cover panel and housing. The marker panel includes a plurality of selectively positioned energy absorbing sections and a plurality of energy transmission sections. The at least one energy source is positioned to direct energy to the marker panel. Energy radiated from the at least one energy source is absorbed by the plurality of energy absorbing sections of the marker panel and directed out of the cover panel by the plurality of energy transmission sections to generate an active signal marker having a unique marker pattern. The active signal marker aiding in the landing of vehicles.

Example 14 includes the active landing marker of Example 13, wherein the at least one energy source is positioned in one of the housing and outside of the housing.

Example 15 includes the active landing marker of any of the Examples 13-14, wherein the plurality of energy transmission sections are one of a plurality of energy transmission sections that allow the energy to pass through and a plurality of energy reflective sections that reflect the energy.

Example 16 includes the active landing marker of any of the Examples 13-15, further including a power source and a controller. The power source is used to power the energy source to generate the energy. The controller is used to selectively couple the power source to the at least one energy source to selectively generate the energy.

Example 17 includes the active landing marker of Example 16, further including a memory, a wireless communication unit, and at least one sensor. The memory is used to store operating instructions implemented by the controller. The wireless communication unit is in communication with the controller. The at least one sensor is used to sense environmental conditions. The controller is configured to control the energy source based on at least sensor data from the at least one sensor and the stored operating instructions.

Example 18 includes a method of generating an active landing marker. The method including forming a unique pattern in a marker panel with a plurality of energy absorbing sections and a plurality of energy transmission sections; generating energy that is absorbed by the energy absorbing sections and transmitted from the energy transmission sections; and polarizing the transmitted energy to define the unique pattern with the transmitted energy that aids in the landing of vehicles during varying environmental conditions.

Example 19 includes the method of Example 18, further including changing the generated energy based on a current environmental condition.

Example 20 includes the method of any of the Examples 18-19, further including changing the unique pattern in the marker panel.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An active landing marker comprising:
 a housing;
 a cover panel coupled to the housing, the cover panel made of polarized translucent material;
 a marker panel positioned within the housing, the marker panel including a plurality of selectively positioned energy absorbing sections and a plurality of energy transmission sections;
 energy sources contained within the housing, the marker panel being positioned between the energy sources and the cover panel, the energy sources including at least one of a near infrared (NIR) energy source and a far infrared (FIR) energy source, energy radiated from each energy source passing through the plurality of energy transmission sections of the marker panel and through the cover panel generating an active signal marker having a unique marker pattern configured to identify the active landing marker to a vehicle, the active signal marker aiding in landing of the vehicle during varying environmental conditions at a landing site;

at least one sensor to sense environmental conditions; and a controller to selectively provide power to the energy sources, the controller configured to switch between energy sources based on a current environment condition sensed by the at least one sensor.

2. The active landing marker of claim 1, wherein the active signal marker is an Augmented Reality University of Cordoba (ArUco) marker, the plurality of energy absorbing sections of the marker panel providing a binary zero of the ArUco marker and the plurality of energy transmission sections providing a binary one of the ArUco marker.

3. The active landing marker of claim 2, wherein the plurality of energy absorbing sections and the plurality of energy transmission sections of the marker panel form an ArUco marker pattern.

4. The active landing marker of claim 1, wherein the plurality of energy absorbing sections of the marker panel are non-reflective black sections.

5. The active landing marker of claim 1, wherein the polarized translucent material of the cover panel is a translucent white polarized material that is configured to emit white light in response to the radiated energy of the energy source.

6. The active landing marker of claim 1, wherein the polarized translucent material of the cover panel is a translucent amber polarized material that is configured to emit amber light in response to the radiated energy from the energy source.

7. The active landing marker of claim 1, wherein the polarized translucent material of the cover panel is a translucent NIR polarized material that is configured to emit NIR light in response to the radiated energy from the energy source.

8. The active landing marker of claim 1, wherein the energy source includes a light source from one of the NIR light source and a light emitting diode (LED) light source.

9. The active landing marker of claim 1, wherein the cover panel further includes at least one of an anti-glare coating and a scratch-resistant coating.

10. The active landing marker of claim 1, wherein the cover panel includes thermal conducting material and thermal insulating material and wherein the energy source includes a thermal source from one of a heating source and a cooling source.

11. The active landing marker of claim 10, wherein the energy source includes at least one of a thermal energy source generating FIR energy signals through the cover panel and a thermoelectric cooling pad.

12. The active landing marker of claim 1, wherein the marker panel is reconfigurable to change the unique pattern of the active signal marker.

13. An active landing marker comprising:
a housing:
a cover panel coupled to the housing, the cover panel made of polarized translucent material;
a marker panel positioned between the cover panel and a cavity of the housing, the marker panel including a plurality of selectively positioned energy absorbing sections and a plurality of energy transmission sections; and energy sources within the cavity of the housing positioned to direct energy to the marker panel, the energy sources including at least one of a near infrared (NIR) energy source and a far infrared (FIR) energy source, energy radiated from the at least one energy source being absorbed by the plurality of energy absorbing sections of the marker panel and directed out of the cover panel by the plurality of energy transmission sections to generate an active signal marker having a unique marker pattern configured to identify the active landing marker to a vehicle, the active signal marker aiding in the landing of the vehicle at a landing site;

at least one sensor to sense environmental conditions; and a controller to selectively provide power to energy sources, the controller configured to switch between energy sources based on a current environment condition sensed by the at least one sensor.

14. The active landing marker of claim 13, wherein the energy sources include at least one light emitting diode.

15. The active landing marker of claim 13, wherein the plurality of energy transmission sections are one of a plurality of energy transmission sections that allow the energy to pass through and a plurality of energy reflective sections that reflect the energy.

16. The active landing marker of claim 13, further comprising:
a power source to power the energy sources to generate the energy; and
a controller to selectively couple the power source to at least one of the energy sources to selectively generate the energy.

17. The active landing marker of claim 16, further comprising:
a memory to store operating instructions implemented by the controller;
a wireless communication unit in communication with the controller; and
the controller configured to control the energy sources based on at least sensor data from the at least one sensor and the stored operating instructions.

18. A method of generating an active landing marker, the method comprising:
forming a unique pattern in a marker panel with a plurality of energy absorbing sections and a plurality of energy transmission sections, the unique pattern configured to identify the marker panel to a vehicle, the marker panel received within a cavity of a housing;
determining a current environmental condition with at least one sensor;
generating energy that is absorbed by the energy absorbing sections and transmitted from the energy transmission sections of the marker panel with at least one of a plurality of energy sources that are located within the cavity of the housing, the plurality of energy sources including at least one of a near infrared (NIR) energy source and a far infrared (FIR) energy source; and
switching between energy sources of the plurality of energy sources based on the determined current environmental condition so the vehicle can identify the marker panel in different environmental conditions to accomplish a landing at a landing site.

19. The method of claim 18, further comprising:
polarizing the transmitted energy to define the unique pattern with the transmitted energy that aids in the landing of the vehicle during varying environmental conditions.

20. The method of claim 18, further comprising:
changing the unique pattern in the marker panel.

\* \* \* \* \*